United States Patent
Preuss et al.

(10) Patent No.: US 12,371,996 B2
(45) Date of Patent: Jul. 29, 2025

(54) HYBRID SUPPLY CONFIGURATION FOR AXIALLY FLOWING HIGH INTERNAL MACH NUMBER BAFFLES

(71) Applicant: Raytheon Technologies Corporation, Farmington, CT (US)

(72) Inventors: Daniel P. Preuss, Glastonbury, CT (US); Dominic J. Mongillo, Jr., West Hartford, CT (US); Jeremy B. Fredette, Hebron, CT (US); Robin Michael Patrick Prenter, St. Augustine, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/882,081

(22) Filed: Aug. 5, 2022

(65) Prior Publication Data
US 2023/0043718 A1    Feb. 9, 2023

Related U.S. Application Data

(60) Provisional application No. 63/230,415, filed on Aug. 6, 2021.

(51) Int. Cl.
*F01D 5/18*    (2006.01)

(52) U.S. Cl.
CPC ............ *F01D 5/18* (2013.01); *F05D 2220/32* (2013.01); *F05D 2260/22141* (2013.01)

(58) Field of Classification Search
CPC ...... F01D 5/18; F01D 5/188; F05D 2250/185; F05D 2260/22141
See application file for complete search history.

(56) References Cited

U.S. PATENT DOCUMENTS 4,153,386 A * 5/1979 Leogrande ............... F01D 5/188
                                                    415/117
5,120,192 A * 6/1992 Ohtomo ................... F01D 5/189
                                                    415/115
(Continued)

FOREIGN PATENT DOCUMENTS

EP    3354854 B1    8/2020

OTHER PUBLICATIONS

European Search Report for European Application No. 22189285.4 mailed Dec. 22, 2022.

*Primary Examiner* — David E Sosnowski
*Assistant Examiner* — Aye S Htay
(74) *Attorney, Agent, or Firm* — Carlson, Gaskey & Olds, P.C.

(57) ABSTRACT

A hollow airfoil body includes a baffle that is arranged in the airfoil body that extends in a radial direction and provides a fluid flow direction. The baffle has multiple holes that include first and second holes that are configured to conduct the cooling airflow in a chordwise direction toward the trailing edge of the airfoil body. The airfoil has a first standoff that extends from the airfoil body to support the baffle. The first axial standoff has a first length that defines an axial passage including the multiple holes. The airfoil includes a second standoff that has a second length less than the first length. The second standoff is arranged radially between the first and second holes. The first hole is smaller than the second hole. The second hole is downstream from the first hole relative to the fluid flow direction.

20 Claims, 6 Drawing Sheets

(56) References Cited

U.S. PATENT DOCUMENTS

| | | | |
|---|---|---|---|
| 5,259,730 A * | 11/1993 | Damlis | F01D 5/189 416/96 A |
| 5,516,260 A * | 5/1996 | Damlis | F01D 5/189 415/115 |
| 7,921,654 B1 | 4/2011 | Liang | |
| 10,669,861 B2 | 6/2020 | Spangler et al. | |
| 10,822,963 B2 | 11/2020 | Spangler et al. | |
| 2002/0090294 A1* | 7/2002 | Keith | F01D 9/04 415/115 |
| 2018/0230814 A1* | 8/2018 | Spangler | F01D 9/041 |
| 2019/0317025 A1* | 10/2019 | Nayeri | F01D 5/189 |
| 2020/0332667 A1 | 10/2020 | Mongillo, Jr. et al. | |

* cited by examiner

HYBRID SUPPLY CONFIGURATION FOR AXIALLY FLOWING HIGH INTERNAL MACH NUMBER BAFFLES

CROSS REFERENCE TO RELATED APPLICATION

This application claims priority to U.S. Provisional Application No. 63/230,415 filed on Aug. 6, 2021.

TECHNICAL FIELD

The present disclosure relates to cooling structures for gas turbine engines, and, more specifically, to airfoil cooling structures.

BACKGROUND

A gas turbine engine typically includes a fan section, a compressor section, a combustor section, and a turbine section. A fan section may drive air along a bypass flow path while a compressor section may drive air along a core flow path. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines. The turbine section includes multiple stages of blades and vanes. As fluid flows through the turbine section, the flow causes the blades to rotate about an axis of rotation. The vanes, positioned between each row of blades, are used to redirect the flow in order to maximize the power received by the downstream blades.

Temperatures within the turbine section may be relatively high, as the flow of fluid is received initially from the combustor section of the gas turbine engine. Cooling air may be extracted from the compressor section and used to cool the gas path components. Cooled components may include, for example, rotating blades and stator vanes in the turbine section.

The airfoils in the turbine section often included multiple cavities, which may be arranged at the leading edge, the trailing edge, and/or other locations. The size and shape of the trailing edge cavity due to the shape of the airfoil coupled with a lower supply pressure source may require the use of a space-eater baffle for cooling.

SUMMARY

In one exemplary embodiment, an airfoil for use in a gas turbine engine includes a hollow airfoil body that extends in a chordwise direction from a leading edge to a trailing edge, and extends in a radial direction from an inner diameter end to an outer diameter end. The airfoil also includes a baffle that is arranged in the airfoil body that extends in the radial direction and provides a fluid flow direction. The baffle has multiple holes that include first and second holes that are configured to conduct the cooling airflow in the chordwise direction toward the trailing edge of the airfoil body. The airfoil further includes a first standoff that extends from the airfoil body to support the baffle. The first axial standoff has a first length that defines an axial passage including the multiple holes. The airfoil further includes a second standoff that has a second length less than the first length. The second standoff is arranged radially between the first and second holes. The first hole is smaller than the second hole. The second hole is downstream from the first hole relative to the fluid flow direction.

In a further embodiment of any of the above, the airfoil includes a rib that extends between the inner diameter end and the outer diameter end to separate a first radial passage from a second radial passage that are configured to conduct at least one cooling airflow in the radial direction through the airfoil body.

In a further embodiment of any of the above, the first radial passage further includes a turn that is configured to direct the cooling airflow from the first cooling structure into the second cooling structure.

In a further embodiment of any of the above, the airfoil further includes a plurality of apertures that are formed in the trailing edge of the airfoil body. The plurality of apertures are configured to conduct the cooling airflow that exits the airfoil body.

In a further embodiment of any of the above, the baffle is arranged within the second radial passage. The multiple holes are directed toward at least one of a suction side wall or a pressure side wall of the airfoil body.

In a further embodiment of any of the above, the multiple holes include at least one first hole and at least one second hole. The first and second standoffs form parallel first and second passageways. The at least one first hole feeds the cooling fluid to the first passageway. The at least one second hole feeds the cooling fluid to the second passageway.

In a further embodiment of any of the above, the airfoil includes another baffle that is disposed in the first radial passage.

In a further embodiment of any of the above, the airfoil body is provided by one of a turbine vane or a turbine blade.

In another exemplary embodiment, a turbine section of a gas turbine engine includes a blade that is coupled to a disk that is configured to rotate about an axis. The turbine section also includes a vane stationary with respect to the axis. The turbine section further includes at least one of the blade or the vane that have an airfoil body of claim 1.

In a further embodiment of any of the above, the turbine section includes a rib that extends between the inner diameter end and the outer diameter end to separate a first radial passage from a second radial passage that are configured to conduct at least one cooling airflow in the radial direction through the airfoil body.

In a further embodiment of any of the above, the first radial passage further includes a turn that is configured to direct the cooling airflow from the first cooling structure into the second cooling structure.

In a further embodiment of any of the above, the turbine section further includes a plurality of apertures that are formed in the trailing edge of the airfoil body. The plurality of apertures are configured to conduct the cooling airflow that exits the airfoil body.

In a further embodiment of any of the above, the baffle is arranged within the second radial passage. The multiple holes are directed toward at least one of a suction side wall or a pressure side wall of the airfoil body.

In a further embodiment of any of the above, the multiple holes include at least one first hole and at least one second hole. The first and second standoffs form parallel first and second passageways. The at least one first hole feeds the cooling fluid to the first passageway. The at least one second hole feeds the cooling fluid to the second passageway.

In a further embodiment of any of the above, the turbine section includes another baffle that is disposed in the first radial passage.

In a further embodiment of any of the above, the airfoil body is a turbine vane.

In another exemplary embodiment, a gas turbine engine includes the turbine section that has a core flowpath and the at least one cooling airflow. The gas turbine engine further includes an airfoil that has the airfoil body according to claim 1 disposed in the core flowpath.

In a further embodiment of any of the above, the gas turbine engine includes a rib that extends between the inner diameter end and the outer diameter end to separate a first radial passage from a second radial passage that are configured to conduct at least one cooling airflow in the radial direction through the airfoil body.

In a further embodiment of any of the above, the first radial passage further includes a turn that is configured to direct the cooling airflow from the first cooling structure into the second cooling structure, and includes another baffle disposed in the first radial passage.

In a further embodiment of any of the above, the gas turbine engine further includes a plurality of apertures that are formed in the trailing edge of the airfoil body. The plurality of apertures are configured to conduct the cooling airflow that exits the airfoil body. The baffle is arranged within the second radial passage. The multiple holes are directed toward at least one of a suction side wall or a pressure side wall of the airfoil body. The multiple holes include at least one first hole and at least one second hole. The first and second standoffs form parallel first and second passageways. The at least one first hole feeds the cooling fluid to the first passageway, and the at least one second hole feeds the cooling fluid to the second passageway.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
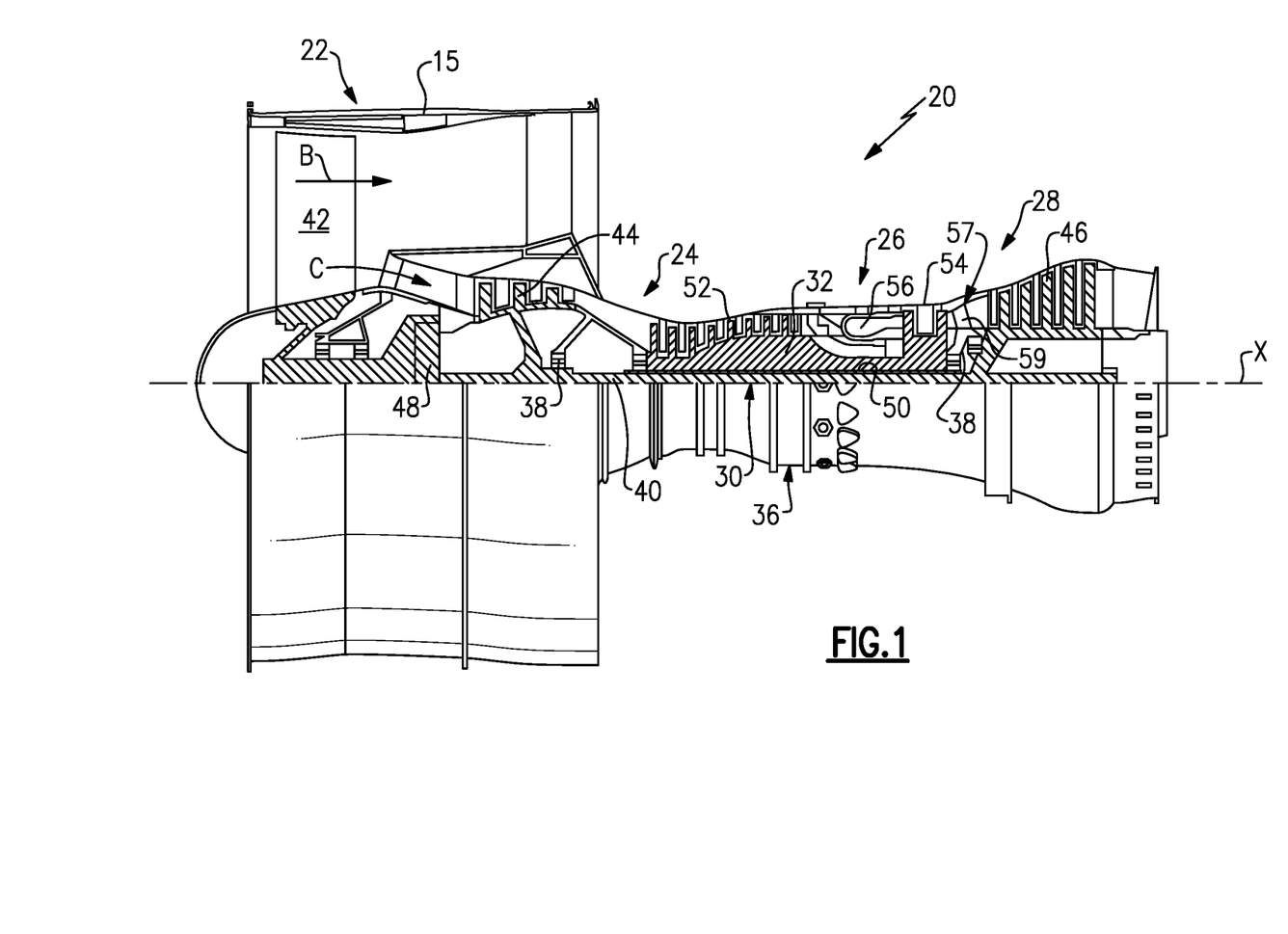
FIG. 1 illustrates a cross-sectional view of an exemplary gas turbine engine, in accordance with various embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by 1bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
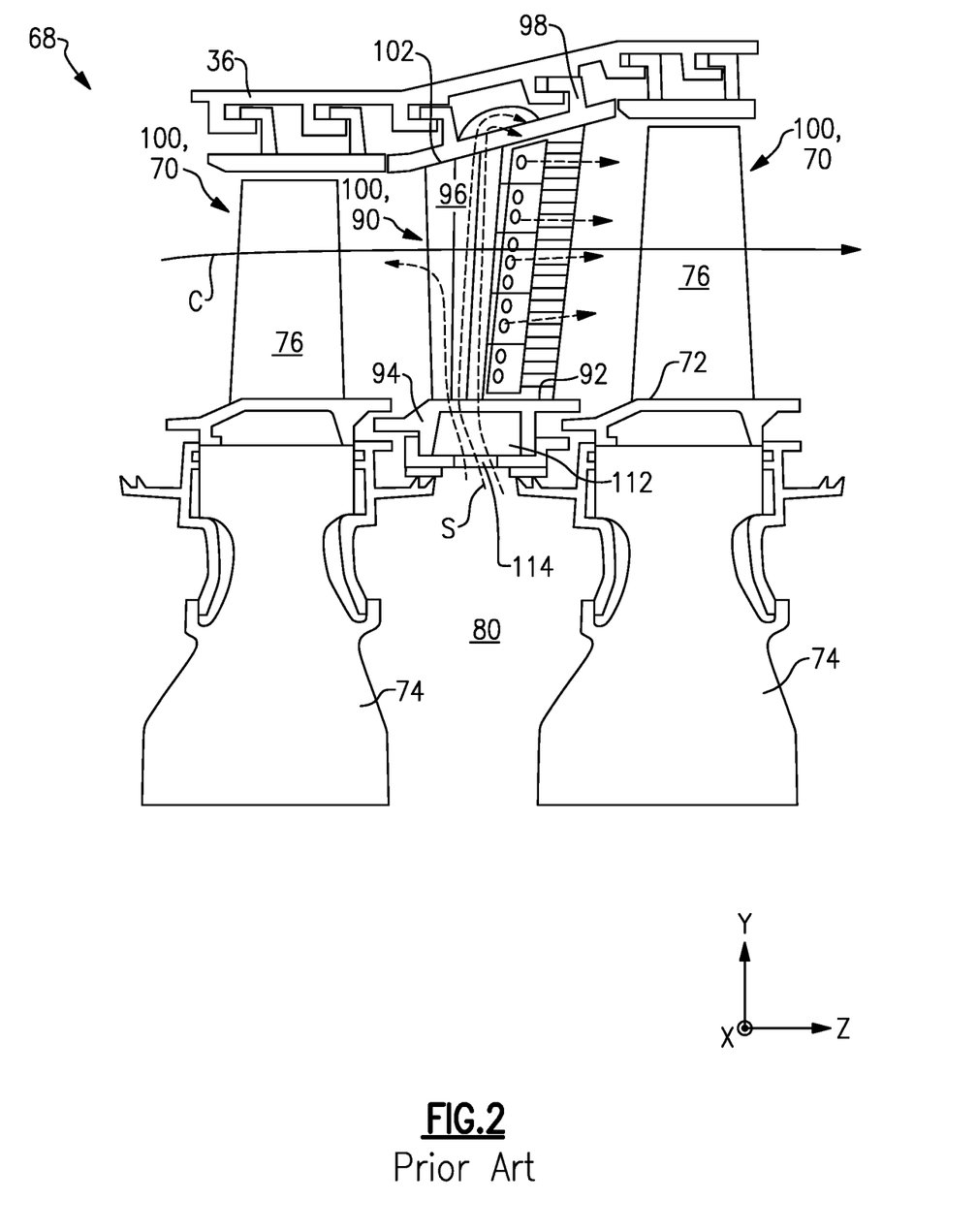
FIG. 2 illustrates an engine section including example airfoils, such as a blade and a vane of an exemplary gas turbine engine, according to prior art embodiment.

Referring now to FIG. 1 and to FIG. 2, according to various embodiments, each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis X. Each compressor stage and turbine stage may comprise multiple interspersed stages of blades 70 and vanes 90. The blades 70 rotate about engine central longitudinal axis X, while the vanes 90 remain stationary with respect to engine central longitudinal axis X. Blades 70 and vanes 90 may be referred to as airfoils 100. For example, FIG. 2 schematically shows, by example, a portion of an engine section 68, which is illustrated as a turbine section 28 of gas turbine engine 20.

With reference to FIG. 2, a schematic view of a portion of engine section 68 is shown, in accordance with various embodiments. Engine section 68 may include a circumferential array of blades 70 coupled about a circumference of a generally circular disk 74. Disk 74 may be disposed radially inward of core flowpath C and centered on the rotation axis of the gas turbine engine. Disk 74 with blades 70 may be configured to rotate about engine central longitudinal axis X Each blade 70 may include an airfoil body 76 with a platform disposed at an inner diameter end wall 72 of the blade 70. A disk cavity 80 may be defined between a forward disk and an aft disk. Upstream (forward) and downstream (aft) of blades 70 are circumferential arrays of vanes 90 configured to guide core flowpath C through the engine section 68.

Each vane 90 may include an airfoil body 96 with an inner diameter platform 94 disposed at an inner diameter end wall 92 of vane 90 and with an outer diameter platform 98 disposed at an outer diameter end wall 102 of vane 90. Outer diameter platform 98 may be coupled to engine case structure 36. Inner diameter platform 94 and/or outer diameter platform 98 may be coupled to or integral with vane 90.

Figure 3A:
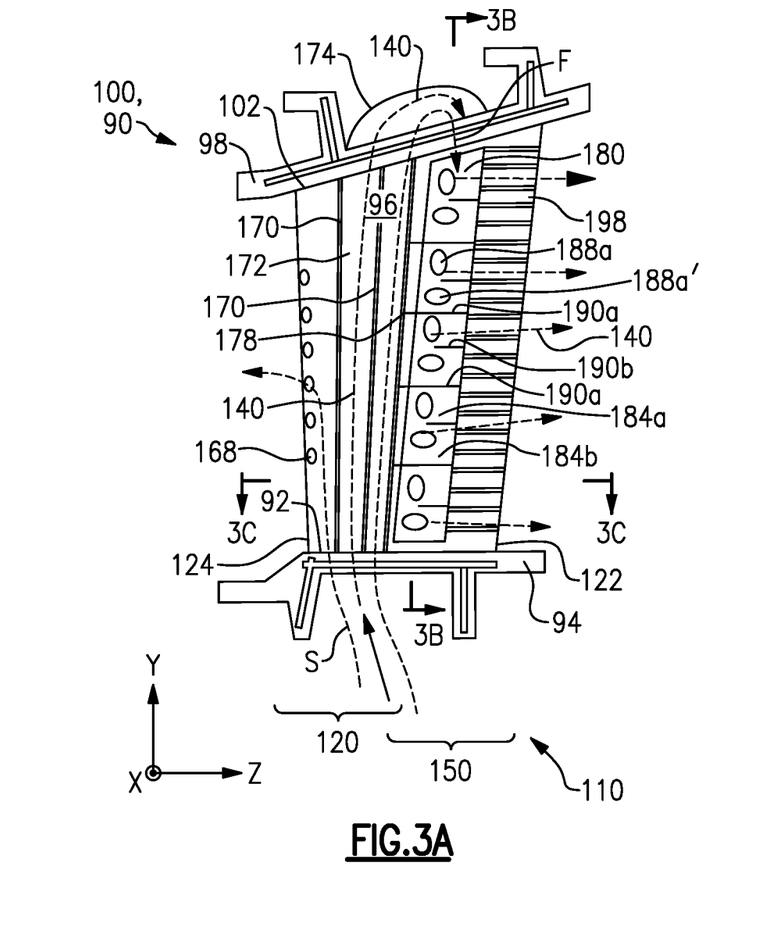
FIGS. 3A, 3B and 3C illustrate views of a vane airfoil including an internal cooling system, in accordance with various embodiments.

In various embodiments and with reference to FIG. 3A and still to FIG. 2, vane 90 may comprise an internal cooling system 110 having a first cooling structure 120 and a second cooling structure 150. Internal cooling system 110 is configured to convectively remove heat from the airfoil body 96 of vane 90. A secondary airflow path S may be defined within disk cavity 80 and may contain a cooling fluid. The cooling fluid, such as bleed air, may be introduced into a cavity 112 of inner diameter platform 94 through an orifice 114 in inner diameter platform 94. In various embodiments, the coolant may flow into a vane via a vane outer diameter cavity. First cooling structure 120 and second cooling structure 150 may be configured to direct the cooling fluid as a cooling airflow 140 through airfoil body 96. Blade 70 may similarly include an internal cooling system, such as internal cooling system 110.

Figure 3B:
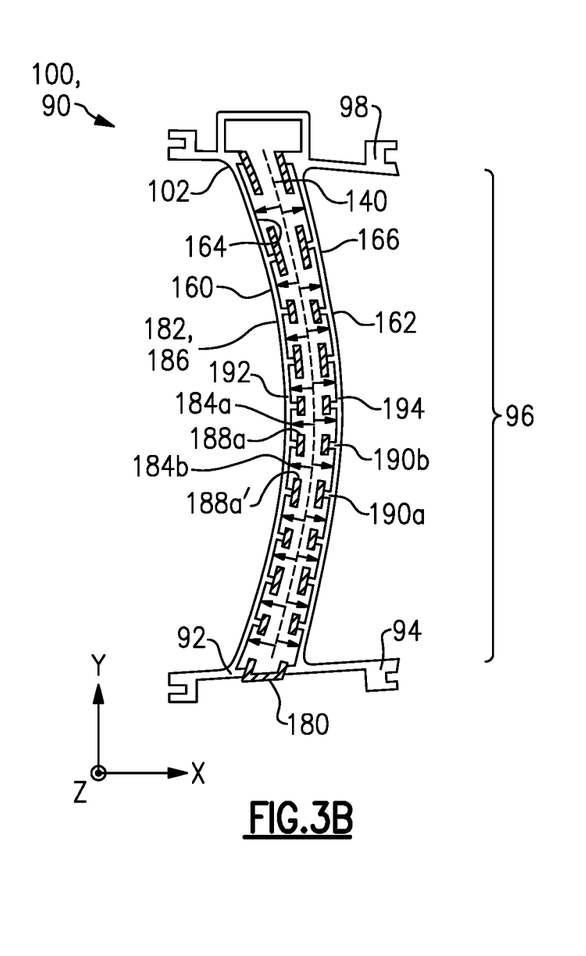

With reference to FIGS. 3A and 3B, a schematic view an airfoil 100 having a first cooling structure 120 and a second cooling structure 150 is shown, according to various embodiments. The airfoil 100 having first cooling structure 120 and second cooling structure 150 may be a blade or a vane. Airfoil 100 is depicted in FIG. 3A as a vane 90, however, the features may be applicable to blades 70 (see FIG. 5). Airfoil 100 may be a vane 90 comprising a trailing edge 122 facing an aft direction in the gas turbine engine and leading edge 124 facing a forward direction in the gas turbine engine. Leading edge 124 and trailing edge 122 may be configured and oriented to direct airflow through engine section 68 (FIG. 2). Airfoil body 96 of vane 90 may extend from an inner diameter end wall 92 to outer diameter end wall 102 of vane 90.

Referring still to FIGS. 3A and 3B, FIG. 3B illustrates a cross-sectional view of an airfoil 100 taken along line 3B-3B of FIG. 3A, in accordance with various embodiments. Airfoil body 96 may include a pressure side wall 160 (i.e. having a generally concave surface) and a suction side wall 162 (i.e. having a generally convex surface) joined together at the respective trailing edge 122 and leading edge 124 (FIG. 3B). An airfoil body 96 may be configured to accommodate first cooling structure 120 and second cooling structure 150.

In various embodiments, an internal cooling system 110 of vane 90 may comprise a first cooling structure 120 configured to remove heat from airfoil body 96. First cooling structure 120 may comprise one or more ribs 170, which may define one or more radial passages 172 within airfoil body 96. Radial passages 172 extend in generally the radial direction, i.e., the y-direction on the provided x-y-z axes. Ribs 170 may extend in the x-y-plane from a pressure side 160 to suction side wall 162, and from the inner diameter end wall 92 to the outer diameter end wall 102. Stated differently, ribs 170 may extend between a pressure side 160 and suction side wall 162, and may extend between the inner diameter end wall 92 and the outer diameter end wall 102. In various embodiments, vane 90 may include any number of radial passages 172 and any number of ribs 170. The radial passages 172 are each separated by ribs 170. Radial passages 172 may be configured to conduct cooling airflow 140 in a radial direction (y-direction) through airfoil body 96. Radial passages 172 operate as a conduit for cooling airflow 140 and provide control over the flow and temperature of cooling airflow 140. By controlling the temperature of cooling airflow 140 via controlling the cross-sectional area of the passage, the airfoil 100 is configured to be more uniformly cooled from inner diameter end wall 92 to outer diameter end wall 102 and from leading edge 124 to trailing edge 122.

In various embodiments, first cooling structure 120 may receive cooling airflow 140 from a secondary airflow path S at inner diameter end wall 92 of airfoil body 96. In various embodiments, first cooling structure 120 may receive the cooling airflow from the outer diameter of the vane. Cooling airflow 140 may be conducted from the inner diameter end wall 92 radially outward through radial passages 172. Radial passages 172 may comprise parallel channels and may have a serpentine geometry. In that regard, the radial passages 172 may include one or more turn 174, which may redirect the cooling airflow 140 from flowing in a first radial direction, such as the positive y-direction, to flowing in a second radial direction, such as the negative y-direction. In that regard, turn 174 may comprise a 180-degree turn. A portion of cooling airflow 140 may be discharged through a plurality of apertures 168 at leading edge 124. Apertures 168 may be cylindrical, circular, oval, teardrop, rectangular, slots, ellipses, irregular, or other shape. Apertures 168 may be radially and/or axially oriented. Another portion of cooling airflow 140 may be directed through radial passages 172 of first cooling structure 120 and to a second cooling structure 150.

Figure 3C:
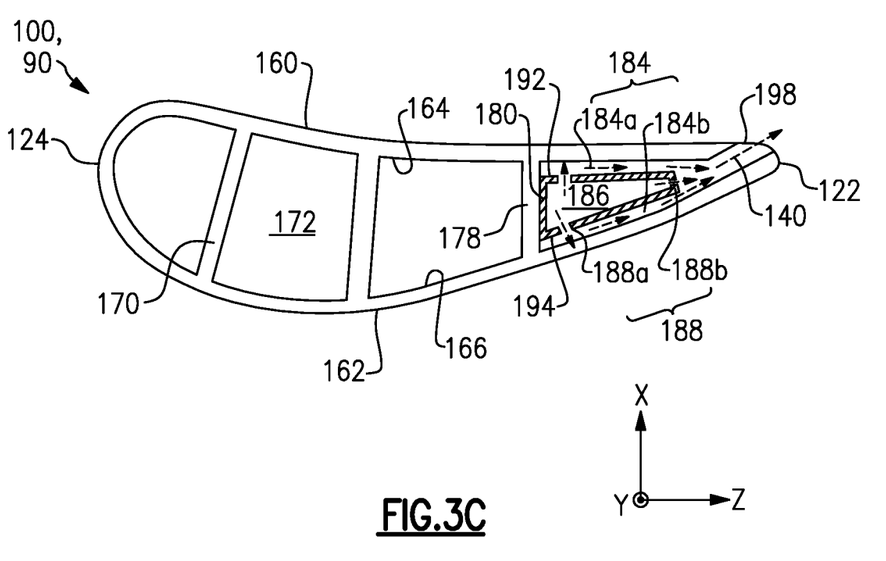

Referring still to FIGS. 3A and 3B and now to FIG. 3C, FIG. 3C illustrates a cross-sectional view of an airfoil 100 taken along line 3C-3C of FIG. 3A, in accordance with various embodiments. Ribs 170 may contact an inner surface 164 of pressure side wall 160 and an inner surface 166 of suction side wall 162. Ribs 170 may couple pressure side wall 160 and suction side wall 162 and may provide structural support to the pressure side wall 160 and suction side wall 162 to reduce bulging and/or deformation of the walls 160, 162 due gas path pressure loadings, metal temperatures, and thermal gradients. A distance between ribs 170 may be decreased, and a quantity of ribs 170 increased (i.e., increasing the density of ribs 170) to provide additional support for walls 160, 162. With the additional support by ribs 170, the airfoil walls, i.e., pressure side wall 160 and suction side wall 162, may be made thinner. The thinner airfoil walls may be more efficiently cooled by cooling airflow 140 than thicker airfoil walls.

In various embodiments and referring still to FIGS. 3A, 3B and 3C, vane 90 may further comprise a second cooling structure 150 configured to remove heat from airfoil body 96. Second cooling structure 150 may comprise one or more baffles 180 which may define one or more radial passages 182 through airfoil body 96. Second cooling structure 150 may further comprise one or more axial passages 184 within airfoil body 96 and extend in a chordwise direction of the airfoil. In various embodiments, second cooling structure 150 may be disposed aft of first cooling structure 120 within the airfoil body 96, and the axial passages 184 may be configured to direct the cooling airflow 140 through an aft portion of the airfoil body 96. Axial passages 184 may include pressure side axial passages and suction side axial passages.

A baffle 180 may extend in the y-z-plane from an aft rib 178 toward trailing edge 122, and from the inner diameter end wall 92 to the outer diameter end wall 102 of airfoil body 96. Baffle 180 may be offset from pressure side wall 160 and suction side wall 162. The pressure source supplying cooling fluid to the first and second cooling structures 120, 150 is also responsible for supplying air to the turbine rotor (i.e., rotor onboard injector (ROBI) using a baffle 180 as a through-flow jumper tube. The cavity sizing, amount of flow pulled through to the ROBI (in area of disk cavity 80), and the amount of additional cooling air required to cool the trailing edge leads to a scenario where Mach numbers inside the baffle reach ~0.2, for example. This relatively high Mach number leads to a significant radial component as the air enters the axial channels, impacting the development region of the channel.

Baffle 180 may define an inner passage 186, which may be a radial passage 182, within baffle 180, and may further define a plurality of openings 188. Cooling fluid flows through the baffle 180 in a fluid flow direction F, as indicated by the dashed arrows in FIGS. 3A and 3B. Openings 188 formed in baffle 180 may include a plurality of first holes 188a and second holes 188a' formed at a pressure side and/or suction side wall. Openings 188 formed in baffle 180 may include a plurality of third holes 188b formed in a trailing edge 189 of baffle 180.

The openings 188 are provided as multiple holes including first and second holes 188a, 188a' that are configured to conduct the cooling airflow in an axial/chordwise direction toward the trailing edge 122 of the airfoil body. A first standoff 190a extends from the airfoil body to support the baffle 180. The first axial standoff 190 has a first length defining an axial passage that includes the multiple holes 188a, 188a'. A second standoff 190b has a second length less than the first length, which form parallel first and second passageways 184a, 184b, in one example. The standoffs could be in other orientations, if desired, for example, them to squeeze or open channels depending on heat-load requirements throughout the span of the airfoil. The second standoff 190b provides an additional heat sink between the airfoil body and the baffle 180.

The second standoff 190b is arranged radially between the first and second holes 188a, 188a'. The first hole 188a is smaller than the second hole 188a', and the second hole 188a' is downstream from the first hole 188a relative to the fluid flow direction F. As a result, the larger second hole 188a' is able to make up for the pressure drop as compared to the smaller first hole 188a as the cooling fluid flows radially. The downstream hole is made larger to encourage more flow through that hole, which in turn acts as a barrier to flow entering from the smaller upstream hole. As a result, the flow entering from the upstream hole is forced to stay within its split channel as opposed to radially migrating to the opposite split channel.

Although only one of each of the first and second holes 188a, 188a' is illustrated, it should be understood that the multiple holes 188 can include more than one first hole 188a and/or more than one second hole 188a'. It is desirable to provide the first passageway 184a, which is upstream from the second passageway 184b, with a smaller effective hole size than the effective hole size associated with the second passageway 184b.

Upon receiving cooling airflow 140 from first cooling structure 120, cooling airflow 140 may be directed through inner passage 186 within baffle 180 in a radial direction, shown in FIGS. 3A and 3B in a radially inward direction (negative y-direction). Cooling airflow 140 may exit the inner passage 186 of baffle 180 through one or more openings 188. Openings 188 may be cylindrical, circular, oval, teardrop, rectangular, slots, ellipses, irregular, or other shape. Openings 188 may be radially and/or axially oriented. The shape and orientation of openings 188 may be configured to optimize the fill characteristics of cooling airflow 140 as the cooling airflow 140 is expelled from baffle 180 and travels in predominately the axial direction (z-direction) adjacent to an inner surface 164 of pressure side wall 160 and to an inner surface 166 of suction side wall 162 toward trailing edge 122 of airfoil 100. Cooling airflow 140 may impinge the inner surfaces 164, 166 of airfoil body 96 and travel axially aft through axial passages 184 toward trailing edge 122. First openings 188a may direct cooling airflow 140 from within baffle 180 toward at least one of the suction side wall 162 or the pressure side wall 160 of the airfoil body 96. Third holes 188b may direct cooling airflow 140 from within baffle 180 toward trailing edge 122 of airfoil body 96.

In various embodiments, axial standoffs 190a, 190b extend inward from inner surfaces 164, 166 of airfoil body 96 toward baffle 180 to direct cooling airflow 140 axially through axial passages 184. Axial standoffs 190a, 190b may contact a first wall 192 and a second wall 194 of baffle 180 to define axial passages 184a, 184b between first wall 192 of baffle 180 and pressure side wall 160 of airfoil body 96 and between second wall 194 of baffle 180 and suction side wall 162. A plurality of apertures 198 may be formed in the trailing edge 122 of the airfoil body 96. The plurality of apertures 198 may operate as a conduit for cooling airflow 140 and may be configured to conduct the cooling airflow 140 exiting the airfoil body 96. Cooling airflow 140 may exit airfoil body 96 though the plurality of apertures 198. The cooling airflow 140 in axial passages 184, as well as first wall 192 and second wall 194 of baffle 180, shield the cooling airflow 140 within inner passage 186 from heat generated by walls 160, 162, preventing heatup of the cooling airflow 140 as it travels radially through inner passage 186, allowing airfoil 100 to be more uniformly cooled.

Figure 4:
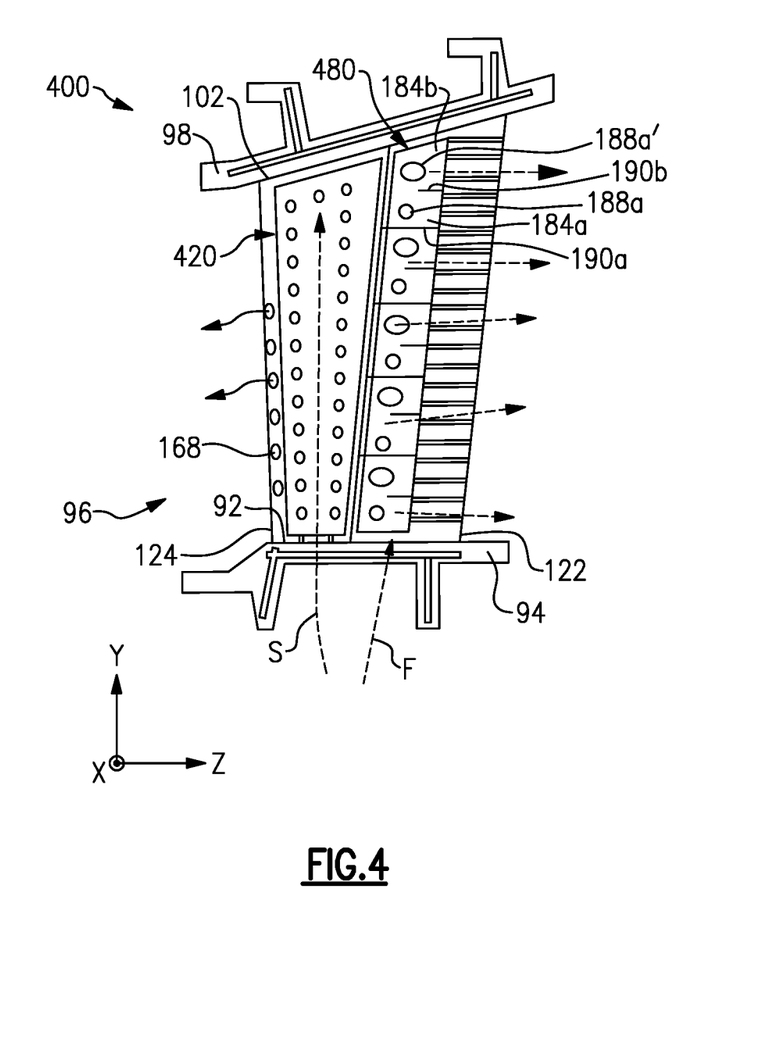
FIG. 4 illustrates a schematic view of an airfoil including an internal cooling system, in accordance with various embodiments.

With reference to FIG. 4, a schematic view of an airfoil 400 is shown, in accordance with various above embodiments. FIG. 4 shows an airfoil 400 including a first cooling structure 420 and a second cooling structure 480, each provided by baffles. In various embodiments, first cooling structure 420 may receive cooling airflow 140 from a secondary airflow path S at inner diameter end wall 92 of airfoil body 96. Another portion of cooling airflow F may be directed through second cooling structure 480. Since the flow direction F is opposite to that shown in FIG. 3A, the positioning of the first and second holes 188a, 188a' is revised.

Figure 5:
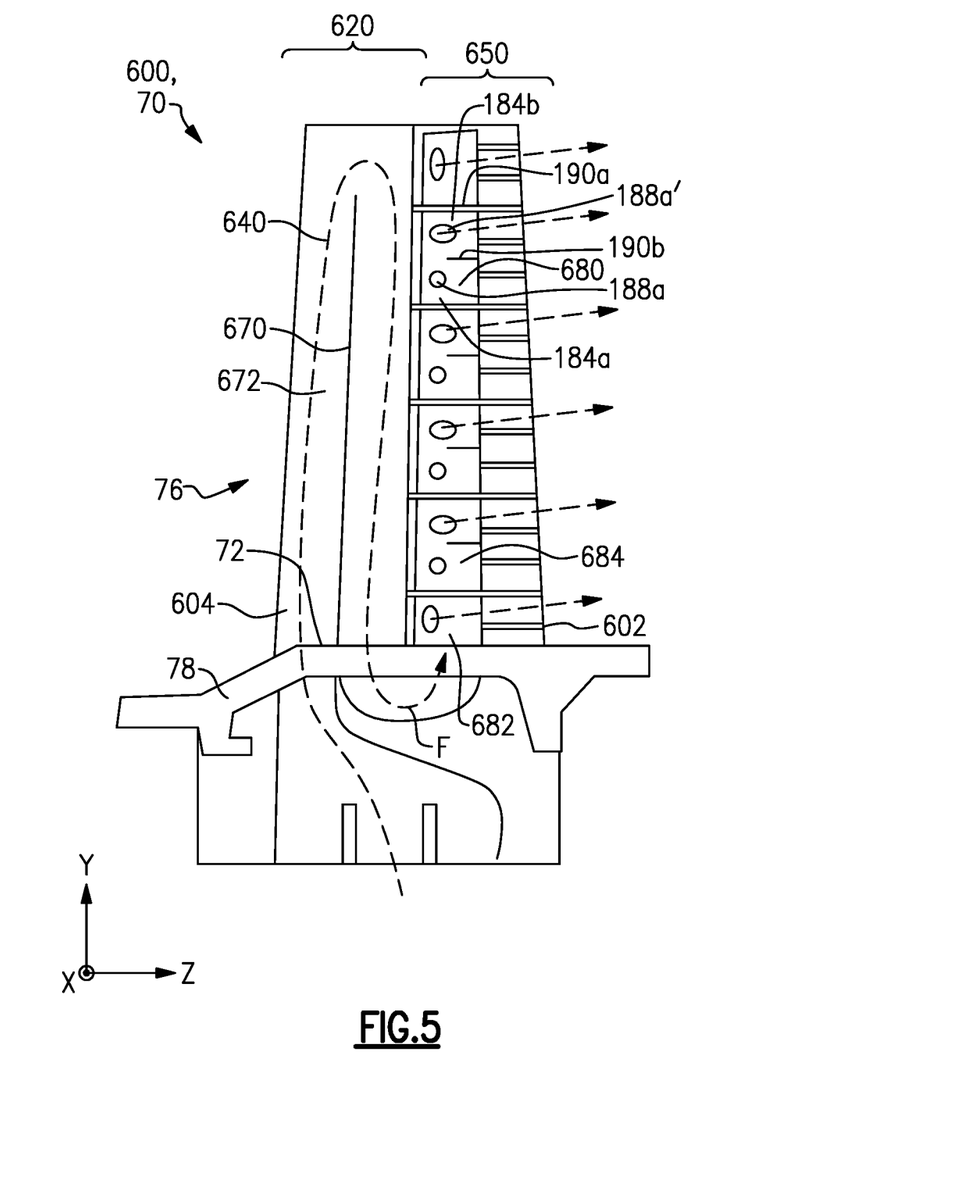
FIG. 5 illustrates a schematic view of a blade airfoil including an internal cooling system, in accordance with various embodiments.

With reference to FIG. 5, a schematic view an airfoil 600 having a first cooling structure 620 and second cooling structure 650, is shown according to various embodiments. The airfoil 600 may be a blade 70 comprising a trailing edge 602 facing an aft direction in a gas turbine engine and leading edge 604 facing a forward direction in the gas turbine engine. The cooling arrangement can be used in a similar manner to the turbine vanes described above. Leading edge 604 and trailing edge 602 may be configured and oriented to direct airflow through engine section 68 (FIG. 2). In various embodiments, blade 70 may comprise a first cooling structure 620 and a second cooling structure 650 configured to remove heat from airfoil body 76. First cooling structure 620 may comprise one or more ribs 670, which may define one or more radial passages 672 within airfoil body 76. Second cooling structure 650 may comprise one or more baffles 680 which may define one or more radial passages 682 through airfoil body 76. Second cooling structure 650 may further comprise one or more axial passages 684 within airfoil body 76. Radial passages 682 and axial passages 684 provide control over the flow and temperature of cooling airflow 640. By controlling the temperature of cooling airflow 640 via controlling the cross-sectional area of the passage, the airfoil 600 is configured to be more uniformly cooled.

The hybrid supply feed according to this disclosure an area bias to account for the radial component of the flow by using different effective hole sizes within each passageway. The up-sized area of the hybrid supply feeds forces re-distribution into the down-stream channel split trailing edge aperture.

This disclosed technology mitigates possible negative effects from cooling system that have high internal Mach number in which lower pressure sources are required to cool large portions of the airfoil. Prior technology does not require a hybrid supply feed dumping into an axial channel in which the flow must fill quickly despite a strong radial component that creates a bias to one side of the channel. This disclosed technology allows the use of high internal baffle Mach numbers within a system design without sacrificing significant heat-transfer capability. Eliminating the radial component generated by the high internal Mach number with this technology improves cooling in downstream channels and adds additional heat transfer features (e.g., additional standoffs). The high Mach number and its inherent challenges to cooling are overcome by the disclosed arrangement.

The disclosed design also implements additional standoffs to consume area, splitting the channels downstream and increasing internal heat transfer coefficients.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the embodiments of the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for use in a gas turbine engine, the airfoil comprising:
    a hollow airfoil body extending in a chordwise direction from a leading edge to a trailing edge, and extending in a radial direction from an inner diameter end to an outer diameter end, wherein the hollow airfoil body includes a pressure side opposite a suction side, the pressure and suction sides extending from the leading edge to the trailing edge;
    a baffle arranged in the airfoil body extending in the radial direction and providing a fluid flow direction, the baffle having multiple holes including first and second holes configured to conduct the cooling airflow in the chordwise direction toward the trailing edge of the airfoil body on one of the pressure and suction sides; and there being a plurality of standoff/hole combinations each including:

a first standoff extending from the airfoil body on the one of the pressure and suction sides to support the baffle, the first standoff having a first length defining an axial passage including the multiple holes; and a second standoff on the one of the pressure and suction sides and having a second length less than the first length, the second standoff arranged radially between the first and second holes, the first hole smaller than the second hole, the second hole downstream from the first hole relative to the fluid flow direction, and the plurality of standoff/hole combinations are spaced along the radial direction, such that each hole and each standoff alternate.

2. The airfoil of claim 1, comprising a rib extending between the inner diameter end and the outer diameter end to separate a first radial passage from a second radial passage that are configured to conduct at least one cooling airflow in the radial direction through the airfoil body.

3. The airfoil of claim 2, wherein the first radial passage further comprises a turn configured to direct the cooling airflow from a first cooling structure into a second cooling structure.

4. The airfoil of claim 2, further comprising a plurality of apertures formed in the trailing edge of the airfoil body, the plurality of apertures configured to conduct the cooling airflow exiting the airfoil body.

5. The airfoil of claim 4, wherein the baffle is arranged within the second radial passage, the multiple holes directed toward at least one of a suction side wall or a pressure side wall of the airfoil body.

6. The airfoil of claim 5, wherein the first and second standoffs forming parallel first and second passageways, the at least one-first hole feeding the cooling fluid to the first passageway, and the second hole feeding the cooling fluid to the second passageway.

7. The airfoil of claim 3, comprising another baffle disposed in the first radial passage.

8. The airfoil of claim 1, wherein the airfoil body is provided by one of a turbine vane or a turbine blade.

9. A turbine section of a gas turbine engine, the turbine section comprising:

a blade coupled to a disk configured to rotate about an axis;

a vane stationary with respect to the axis;

at least one of the blade or the vane having an airfoil body of claim 1.

10. The turbine section of claim 9, comprising a rib extending between the inner diameter end and the outer diameter end to separate a first radial passage from a second radial passage that are configured to conduct at least one cooling airflow in the radial direction through the airfoil body.

11. The turbine section of claim 10, wherein the first radial passage further comprises a turn configured to direct the cooling airflow from a first cooling structure into a second cooling structure.

12. The turbine section of claim 10, further comprising a plurality of apertures formed in the trailing edge of the airfoil body, the plurality of apertures configured to conduct the cooling airflow exiting the airfoil body.

13. The turbine section of claim 12, wherein the baffle is arranged within the second radial passage, the multiple holes directed toward at least one of a suction side wall or a pressure side wall of the airfoil body.

14. The turbine section of claim 13, wherein the first and second standoffs forming parallel first and second passageways, the first hole feeding the cooling fluid to the first passageway, and the second hole feeding the cooling fluid to the second passageway.

15. The turbine section of claim 11, comprising another baffle disposed in the first radial passage.

16. The turbine section of claim 9, wherein the airfoil body is a turbine vane.

17. A gas turbine engine, comprising:

the turbine section having a core flowpath and the at least one cooling airflow;

an airfoil having the airfoil body according to claim 1 disposed in the core flowpath.

18. The gas turbine engine of claim 17, comprising a rib extending between the inner diameter end and the outer diameter end to separate a first radial passage from a second radial passage that are configured to conduct at least one cooling airflow in the radial direction through the airfoil body.

19. The gas turbine engine of claim 18, wherein the first radial passage further comprises a turn configured to direct the cooling airflow from a first cooling structure into a second cooling structure, and comprising another baffle disposed in the first radial passage.

20. The gas turbine engine of claim 18, further comprising a plurality of apertures formed in the trailing edge of the airfoil body, the plurality of apertures configured to conduct the cooling airflow exiting the airfoil body, wherein the baffle is arranged within the second radial passage, the multiple holes directed toward at least one of a suction side wall or a pressure side wall of the airfoil body, wherein the first and second standoffs form parallel first and second passageways, the first hole feeding the cooling fluid to the first passageway, and the second hole feeding the cooling fluid to the second passageway.

* * * * *